United States Patent [19]
Sheppard

[11] 3,826,328
[45] July 30, 1974

[54] DUAL HYDRAULIC POWER STEERING SYSTEM

[76] Inventor: Richard H. Sheppard, c/o R. H. Sheppard Co., Hanover, Pa. 17331

[22] Filed: Mar. 20, 1972

[21] Appl. No.: 236,410

[52] U.S. Cl............. 180/79.2 R, 60/420, 91/411 R, 137/625.69, 280/95 R
[51] Int. Cl.............................................. B62d 5/10
[58] Field of Search........ 180/79.2 R; 280/89, 95 R; 60/420, 484, 486; 91/411 R; 92/136; 137/625.69

[56] References Cited
UNITED STATES PATENTS

| | | | |
|---|---|---|---|
| 1,625,224 | 4/1927 | Seawell | 280/95 R |
| 2,152,660 | 4/1939 | Paton | 280/95 R |
| 3,012,543 | 12/1961 | Sheppard | 92/136 X |
| 3,079,896 | 3/1963 | Johnston | 92/86 X |
| 3,163,175 | 12/1964 | Pearson | 137/625.69 X |
| 3,195,575 | 7/1965 | Sheppard | 92/136 X |
| 3,307,586 | 3/1967 | Meyer | 137/625.69 |
| 3,543,644 | 12/1970 | Stacey | 91/411 R |
| 3,602,326 | 8/1971 | Garrison | 180/79.2 R |

*Primary Examiner*—Robert G. Sheridan
*Assistant Examiner*—Leslie J. Paperner
*Attorney, Agent, or Firm*—Lowe, King and Price

[57] ABSTRACT

Steering for wheels of a vehicle is provided by two separate and independent steering combinations of first and second power operating units, corresponding first and second power supply means and control means with each combination providing only approximately 50 percent of the total design force required to allow the operator of the vehicle to comfortably turn the wheels. The system thus is designed to provide a safety factor of allowing approximately one-half force power steering upon failure of one combination. With two operating units, one adjacent each wheel, a resilient interconnection in the tie rod of the steering linkage is required. In a tandem wheel arrangement, a steering gear or operating unit is provided on each axle. The preferred embodiment includes a master steering gear assembly on one side of the vehicle and a slave gear assembly on the other with two in-piston valves positioned in the master steering gear unit. The valves include spool elements that are both guided and maintained in alignment by a guide pin having three guide surfaces. Transfer of the fluid in the second combination includes telescoping tubes extending through and forming a seal with the passageway at the end of the piston of the master unit. The two spool elements are accurately positioned during manufacture by interposed resilient means and radial locking pin arrangement.

14 Claims, 10 Drawing Figures

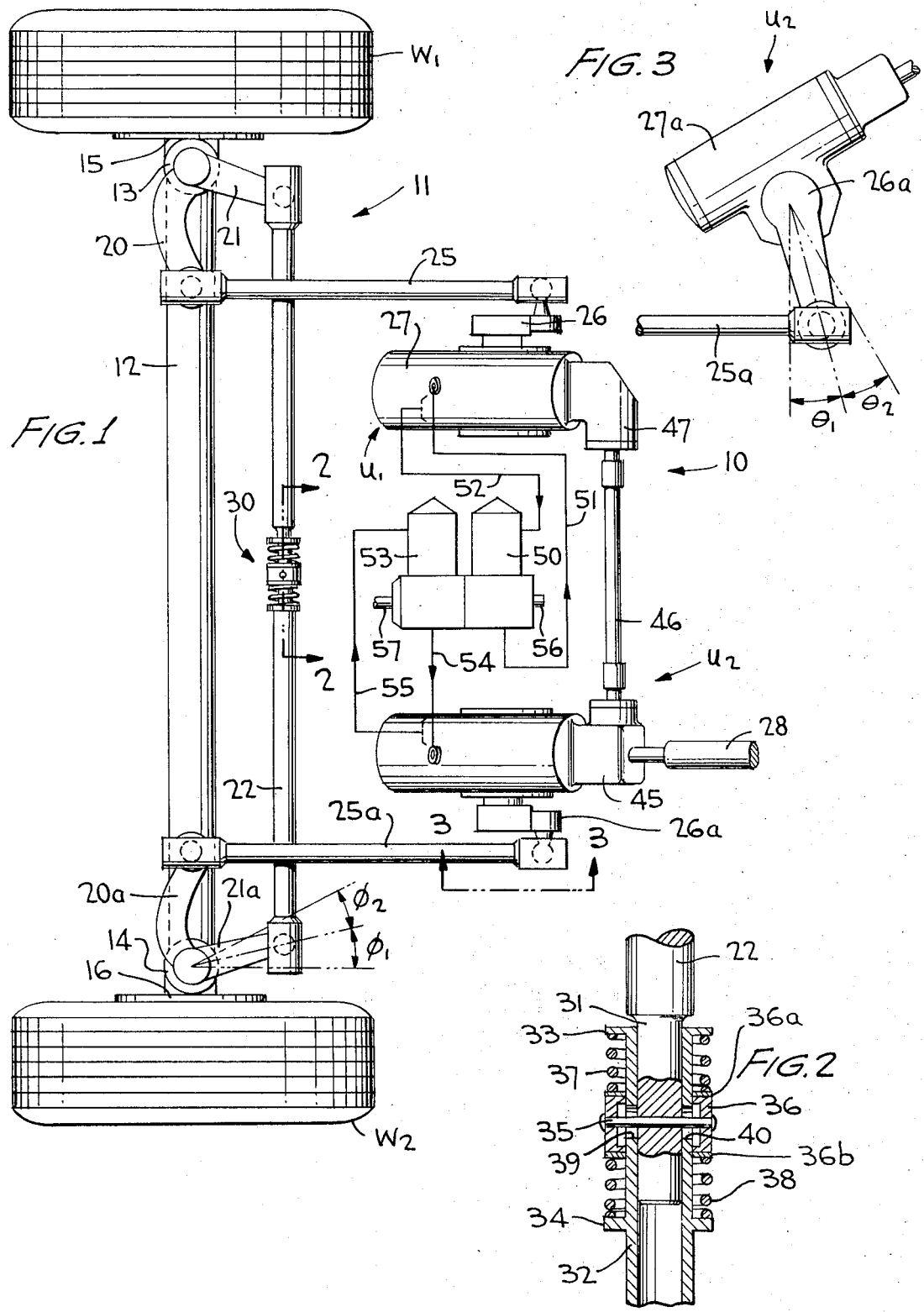

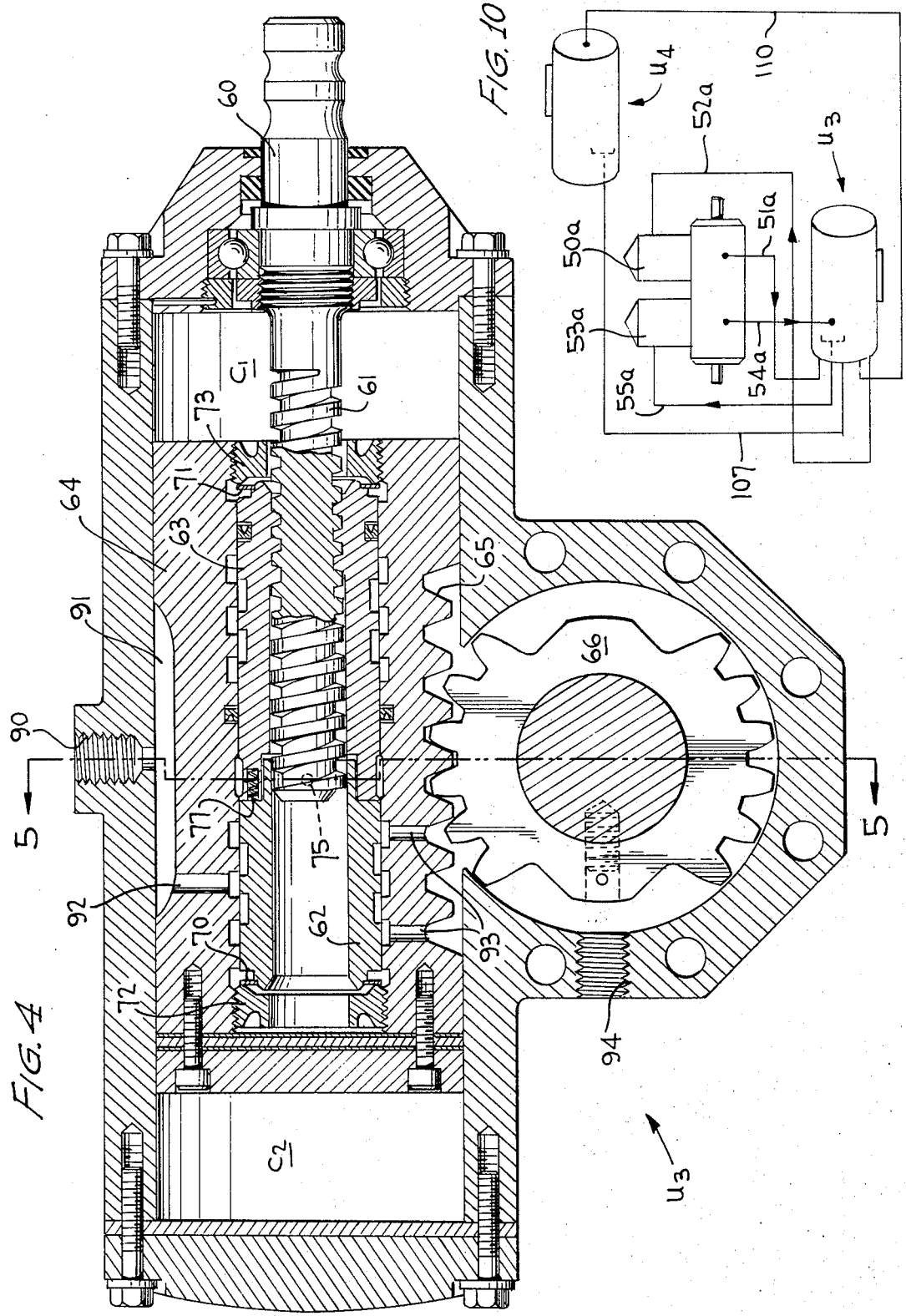

DUAL HYDRAULIC POWER STEERING SYSTEM

The present invention relates to power steering of wheeled vehicles, and more particularly, to a dual power steering system with separate and independent power operating combinations.

BACKGROUND OF THE INVENTION

In the field of automotive engineering, the last decade has brought increased emphasis on development of safety systems in an effort to reduce the number of accidents caused by mechanical failure. Innovations for the safety of the driver and passenger of vehicles are being introduced rapidly with each model year. Seat and shoulder restraining belts, dual cylinder brake systems, improved structural reinforcement in critical areas of the body, key removal responsive steering and transmission locking devices, collapsible steering columns, pop-out windshields and cushioned bumpers are just a few of the inventions that are finding their way into the automobile and truck of today.

One of the areas of safety improvement that is left and one that is on the immediate horizon pertains to the steering systems of our automobiles and trucks. Almost every vehicle today is equipped with power steering systems that in and of themselves make the vehicle safer since the vehicle is inherently easier to control with the power assist. However, this increased safety is present only so long as there is no failure in the mechanical parts of the system. Once a failure has occurred, the driver is suddenly faced with steering the vehicle manually. In many instances, this in and of itself may cause panic that in a split second results in an accident, particularly if the vehicle is traveling at relatively high speed.

When equipment failure occurs in an automobile, the backup, non-power steering arrangement gives the driver, even in panic, a fighting chance of bringing the vehicle under control. In trucks, however, the size and weight of the vehicle and the size of the steering system itself make it more likely that control cannot be regained once equipment failure occurs, especially in tight driving situations. Even if the driver can bring the vehicle under control and to a safe stop, he is in danger of losing his cargo, if it is perishable, and spending several hours or days broken down in remote country where repair facilities are not available. Such countries as Australia where vast distances between populated areas occur, the risk of being broken down has been recognized as a problem that has definitely hindered the trucking industry and if solved could bring back the competitive edge to trucks.

In the average to large size truck or off-the-road vehicle of today, it takes approximately 100 foot pounds of torque without power steering to turn the wheels through the standard mechanical interconnection when the vehicle is not moving or moving very slowly, which is well beyond the upper limit of strength of the average man while sitting on a seat with a back. With power steering, the torque required is reduced to approximately 3 to 5 foot pounds, which facts dramatize the significance and indeed the absolute requirement for power steering, especially in the modern, heavy-duty truck and off-the-road vehicle field.

OBJECTIVES OF THE INVENTION

Thus, it is one object of the present invention to provide a dual power steering system, especially adapted to and needed by trucks, to provide a safety factor in the steering system.

It is another object of the present invention to provide a dual power steering system wherein upon failure of one combination of components, another independently operating combination of components allows steering of approximately one-half of the design force, which allows the vehicle to be safely operated until a service facility is reached.

It is still another object of the present invention to provide a dual system in accordance with the above objectives with two operating units and with compensating means in the tie rod for errors in geometry.

It is still another object of the present invention to provide a dual power steering system as described wherein a master steering gear assembly incorporates a novel double spool valve and hydraulic distributing network to operate said dual system.

BRIEF DESCRIPTION OF THE INVENTION

A dual power steering system built in accordance with the teachings of the present invention includes first and second combinations or subsystems of components that are separate and independently operated so that upon failure of one combination the other combination is still operative. This redundancy in the system is provided in accordance with the invention with each combination providing approximately 50 percent of the total design force required to allow the operator of the vehicle to comfortably turn the wheels of the vehicle. The design torque for power steering systems is such as to allow steering with the application of about 5 foot pounds of torque to the steering shaft. The increased force required to operate the steering system with one operating unit out would not be noticeable except in deep mud or snow or extreme emergency. This feature allows the operator to safely and with ease continue on the journey until a convenient service facility is reached to repair the steering system. In fact, with a steering system constructed in accordance with the present invention, with one combination of components out, an operator would probably not even be able to feel the failure if traveling more than a few miles per hour and on a normal road surface so that a warning light is contemplated to tell the driver when repairs are necessary. Thus, the vehicle cannot only continue without difficulty, but the likelihood of panic in an emergency is eliminated making the vehicle many times safer than before, and in fact, virtually failsafe as far as the steering system is concerned.

The first and second power operating units are preferably steering gear assemblies mounted on the vehicle at opposite ends of the steering linkage adjacent the front wheels to be steered. In accordance with another feature of the invention, resilient means is provided in the tie rod connecting the wheels to compensate for variations in geometry of the steering linkage. In a tandem steering wheel or dual front axle arrangement now becoming popular on heavy duty trucks, one steering gear assembly is mounted to operate on each axle.

Separate first and second power supply means or pumps are interconnected along separate fluid transfer networks including first and second control means or valving arrangement. The valving arrangements in a preferred embodiment include axially aligned spool elements in the piston of the master power steering gear assembly. A guide pin is provided in the piston having two parallel guide surfaces and a third radially inwardly facing guide surface acting on the spool elements to prevent rotation and to maintain perfect alignment, respectively. The fluid transfer network for the second steering combination includes telescoping tubes extending through and forming a seal with a cooperating passageway at the end of the piston of the master power steering gear assembly.

The separate spool valve elements are positioned together so as to be synchronized with the fluid transfer passageways in the piston in a novel manner. To explain, the spool elements are placed in the interior of the piston with spring means interposed therebetween and adjustable rings and annular leaf springs holding the spools at the opposite ends. The adjustable rings are positioned during assembly of the spool elements in the piston until perfect alignment is gained, and then radial holes are drilled in the elements and locking pins inserted. Installment of the locking pins is provided through apertures in the piston. The locking pins are provided on opposite sides (180° apart) of the spool elements with the aforementioned guide pin being angularly displaced therefrom to maintain alignment of the spool elements.

Still other objects and advantages of the present invention will become readily apparent to those skilled in this art from the following detailed description, wherein I have shown and described only the preferred embodiments of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature and not as restrictive.

BRIEF DESCRIPTION OF THE DRAWINGS

FIG. 1 is a top view of a representative vehicle wheel steering system with the dual hydraulic power steering system of the present invention, all shown in schematic form;

FIG. 2 is an enlarged view of a resilient, telescoping connection in the tie rod of the steering linkage in accordance with the present invention;

FIG. 3 is a side view of one power steering gear assembly as taken along line 3—3 of FIG. 1;

FIG. 4 is a cross-sectional view taken along the center line of a master steering gear assembly that may be utilized with the dual system of the present invention;

FIG. 10 is a schematic diagram of an alternative dual hydraulic power steering system utilizing the master steering gear of FIG. 4.

DETAILED DESCRIPTION OF THE PREFERRED EMBODIMENT

Figure 6:
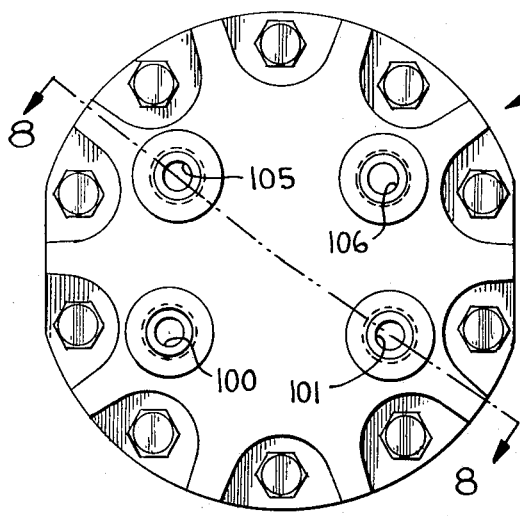
FIG. 6 is an end view of the master power steering gear assembly of FIG. 4.
Figure 7:
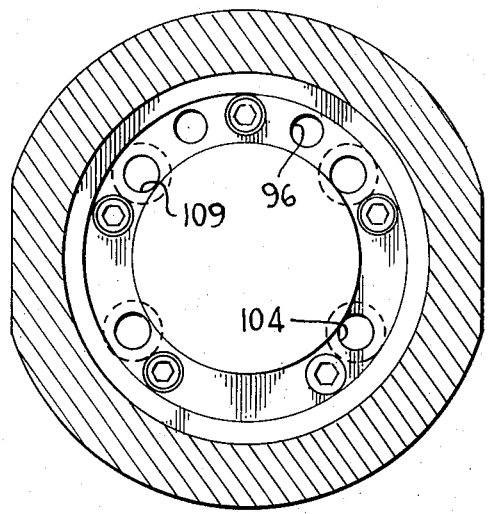
FIG. 7 is a cross-sectional view of the interior of the master power steering gear assembly (with parts removed for clarity) taken along line 7—7 of FIG. 9.

With reference now specifically to the Figures of the drawing for a more complete discussion of the principles of the invention, FIG. 1 shows the overall structure in schematic form and from which the broad principles of the dual power steering system may be readily understood. The power steering system per se is generally designated by the reference numeral 10 in FIG. 1 with the interconnected steering linkage being generally designated by the reference numeral 11. The steering linkage 11 is supported in any conventional manner, such as on a front axle 12 of a vehicle having king pin support eyes 13, 14 at the ends. Wheels $W_1$, $W_2$ of the vehicle are supported on the axle 12 by typical spindle assemblies 15, 16, respectively. It is to be understood that the dual power system 10 of the present invention is well adapted for any type of wheeled vehicle including trucks and automobiles, as well as off-the-road equipment, with one or more axles used for steering. In addition, instead of solely steering the wheels on a front axle or axles of a vehicle, the system 10 of the present invention could, of course, be adapted for steering any combination of wheels, including the rear wheels, in such installations as commonly occur in off-the-road equipment.

The steering linkage 11 comprises a steering arm 20 that is connected to the spindle assembly 15 adjacent the wheels $W_1$. In the present inventive dual system, a counterpart steering arm 20a is provided on the opposite side of the vehicle adjacent the second wheel $W_2$. Also fixed to the steering arms 20, 20a are crank arms 21, 21a that are interconnected by a tie rod 22 to synchronize the steering of said wheels $W_1$, $W_2$. In other words, when the crank arm 21a moves through an angle $\phi_1$, as shown, the wheel $W_2$ is turned to the right for steering to the right. And through the interconnection of the tie rod 22, the wheel $W_1$ is also turned through an appropriate steering angle in the same direction. Similarly, steering to the left is generated by moving the crank arm 21a through an angle $\phi_2$ with the wheels $W_1$, $W_2$ moving through the corresponding angle.

Still referring to FIG. 1, the steering motion to the linkage 11 is imparted concurrently to the steering arms 20, 20a by drag links 25, 25a, respectively. The drag links are reciprocated in turn by cranks 26, 26a of first and second power operating units, generally designated by the reference indicia $U_1$, $U_2$, respectively. As best shown in FIGS. 1 and 3, the power operating units $U_1$, $U_2$ are or may be typical power steering gear assemblies with the cranks 26, 26a being positioned along the lower portion of the housing 27, 27a, respectively. It will be understood that as the crank 26 and the crank 26a move through angles $\theta_1$, $\theta_2$, the corresponding steering angles $\phi_1$, $\phi_2$, previously discussed, will be made.

While the steering gear assembly is preferred for the operating units $U_1$, $U_2$, it should be understood that other types of units, such as power cylinders, could be used in lieu of the arrangement shown here. Also, while right unit and a left unit are preferably employed for the respective opposite sides of the vehicle to keep the units inboard of the drag links 25, 25a, either one or both of the units $U_1$, $U_2$ could be positioned outboard if desired by employing the appropriately oriented units. Further, in a tandem front axle vehicle, the units $U_1$, $U_2$ may be placed on one side operating through the drag links 25, 25a different steering linkages for the wheels of the separate axles. The coordinated timing may be established by providing double-throw pitman arms for each unit $U_1$, $U_2$ in lieu of the cranks 26, 26a, and interconnecting said arms with a separate drag link or connecting rod (not shown) at the upper end of said arms.

The power steering gear assemblies may be of conventional construction and reference may be made to my previous patents, "Piston for Power Steering System" Sheppard, U.S. Pat. No. 3,092,083, issued June 4, 1963, and "Power Steering Gear," Sheppard, U.S. Pat. No. 3,566,751, issued Mar. 2, 1971, for specific combinations that may be efficiently employed as the operating units $U_1$, $U_2$. However, in accordance with this invention, the units are properly sized to fit the vehicle upon which they are to be employed so that each unit $U_1$, $U_2$ when activated produces only approximately 50 percent of the total design output force to the respective drag links 25, 25a.

To explain, present-day standards for power steering require that the input torque to turn steering shaft 28 (see FIG. 1) of a typical vehicle be maintained at approximately three to five foot pounds of torque. Thus, to put the requirements of the present invention another way, the combined force of the operating units $U_1$, $U_2$ would be such as to apply sufficient force to the drag links 25, 25a to provide proper steering by application of only 3 to 5 foot pounds of input torque to the shaft 28. Each unit $U_1$, $U_2$ is thus theoretically performing one-half of the work to properly steer the vehicle wheels $W_1$, $W_2$. Upon failure of one of the units $U_1$, $U_2$, the redundancy in the system would thus allow continuation of steering. The total design output force generating capability that must be built into the system for power turning the wheels is that force required to turn the wheels under the severest of conditions. Since the output force required for steering, when the vehicle is moving and not under severe conditions, i.e., not in deep mud or snow, or with the wheels against a curb, is only a fraction of the actual power steering system capability, the driver may not even discern the failure of one subsystem by feel through the input torque that must be applied to the steering shaft 28 and he must rely on appropriate warning lights.

As a practical matter, the power operating units $U_1$, $U_2$ are positioned on the chassis of the vehicle in as near as the same relative orientation with respect to the linkage as possible (see FIG. 1). In other cases, where frame members or the like interfere with the exact relative positioning of the units, the components of the linkage at opposite sides of the vehicle may be designed to compensate for some of the variation in the movement of the cranks 26, 26a. In any case, however, errors in geometry are virtually impossible to completely eliminate, at least without unduly costly manufacturing and assembly tolerances, and in accordance with a feature of the present invention, these errors in geometry are compensated for by a resilient interconnection 30 in the tie rod 22.

This interconnection 30 is shown in FIG. 1 in relation to the overall steering linkage 11, and is shown in enlarged detail in FIG. 2. Thus, one half of the tie rod 22 has a reduced portion or inside member 31 that telescopingly engages within the hollow end or outer member 32 of the other half of the tie rod 22. The outer member 32 has a first flange 33 at the end thereof and a second flange 34 spaced inwardly from the end. A pin 35 is fixed to the inner member 31 and is provided with an annular channel-shaped retaining ring 36 that is positioned around the outer member 32 half way between the flanges 33, 34. Springs 37, 38 are pre-loaded and interact between the inner and outer members 31, 32 by being positioned between washers 36a, 36b on the ring 36 and the flanges 33, 34. The pin 35 is capable of axial movement by virtue of elongated slots 39, 40 formed in the outer member 32. Thus, it can be seen that as the drag links 25, 25a apply force to the steering linkage 11 and the tie rod 22 attempts to synchronize these movements, any error in geometry causing a discrepancy of movement will be accommodated by the pin 35 moving axially with respect to the slots 39, 40 thereby preventing damage to the parts of the linkage 11. In other words, the springs 37, 38 allow compensating enlargement or contraction of the tie rod 22 thus compensating for slight differences in movement caused by errors in geometry in the linkage 11.

With reference back to FIG. 1 of the drawings, further description of the power steering system 10 and its major components may be explained. The power operating unit $U_1$ and the sister operating unit $U_2$ must first be interconnected in some manner by a control means that allows synchronized operation of the output cranks 26, 26a. In the embodiment shown in FIG. 1, a representative way of obtaining this synchronized control is shown. The steering shaft 28 is connected to a gearbox 45 that allows straight-through drive to a fluid valve in the unit $U_2$ and also provides a lateral control shaft 46 that turns in synchronization with the steering shaft 28. For example, the gearbox 45 may include mating bevel gears of equal size mounted on the shafts 28, 46. The shaft 46 then drives through another gear assembly 47 to impart the identical rotary movement to the control valve of the unit $U_1$. Thus, it will be realized in the embodiment shown in FIG. 1, both the units $U_1$, $U_2$ are complete power steering gear assemblies with integral valves that are controlled through synchronized control means 28, 45, 46, 47. Each of the units $U_1$, $U_2$ can thus be a power steering gear assembly as shown in either of my previous above-identified patents and simply selected as to size to generate approximately one-half of the total design force needed to turn the wheels $W_1$, $W_2$ and modified to employ the interconnecting control means. This manner of interconnecting the units $U_1$, $U_2$ has been shown merely for illustrative purposes and other equivalent systems could be utilized in accordance with the broad aspects of the present invention. In fact, an alternative method utilizing master and slave gear units and a single tandem valve will be shown and described below, in conjunction with FIGS. 4–10.

With reference back to FIG. 1 at the present however, the power operating units $U_1$, $U_2$ are seen to be provided with separate and independent power supply means in the form of a first hydraulic pump 50 with transfer lines 51, 52 running to the unit $U_1$ and a second hydraulic pump 53 with transfer conduits 54, 55 connected to the unit $U_2$. Each of the pumps operates independently, and can, for example, have separate drive shafts 56, 57 as shown in FIG. 1.

From the description so far, it can now be seen that a first combination of power operating unit $U_1$, control means 46, 47 plus the valve in the unit $U_1$ (not shown) and supply means in the form of a pump and combined sump 50 is independent and separate from a second combination of the power operating unit $U_2$, control means 45 plus the integral valve of the unit (not shown) and the pump and combination sump 53. If one of the components of either combination should fail causing that combination to cease working, the other combination is still in complete working order and providing power to the steering upon operation of the steering shaft 28. The output crank 26, 26a of the unit $U_1$, $U_2$ of the combination that is affected by the failure is moved through the mechanical interface provided in the unit, as is well known and fully described in my aforementioned patents.

In FIGS. 4-9, there is shown a master power steering gear assembly $U_3$ including a novel valving and fluid transfer arrangement that allows the employment of a simplified control means for synchronization with a slave gear $U_4$ (see FIG. 10) and thus is considered to be a preferred embodiment of the present invention. In this alternative embodiment of a power operating unit used in lieu of the unit $U_2$ of FIG. 1, the steering shaft 28, as shown in FIG. 1, would be connected directly to the operating shaft 60 of the master power steering gear assembly $U_3$. The shaft 60 is provided with a thread 61 that engages in threaded relationship with a tandem spool valve T comprising a first spool element 62 and a second spool element 63. The spool element 62 has circular passageways that cooperate in the usual manner with like circular passageways formed internally in reciprocating power piston 64 to direct fluid to and from opposite end chambers $C_1$, $C_2$ to effect power steering by the assembly $U_3$. In other words, insofar as the element 62 is concerned and as can be seen more clearly by referring to my previous two patents mentioned above, the screw 61 causes the tandem valve T to move in the axial direction thereby providing flow transfer between the passageways in the piston in the desired direction to chambers $C_1$, $C_2$ to cause hydraulic shifting of the piston thus creating the power steering assist. This is provided specifically through integral rack 65 of piston 64 that operates an output gear 66, which in turn operates the crank, such as crank 26a shown in FIG. 1. The slave gear assembly $U_4$ (FIG. 10) is utilized in lieu of the unit $U_1$ of FIG. 1, as will be realized.

At the ends of the tandem spool elements 62, 63 are provided annular spring washers 70, 71 that act in turn against adjustable rings 72, 73. These washers 70, 71 serve to provide the mechanical interface between the movable tandem valve T and the piston 64 when the hydraulic power system experiences failure. In other words, the turning of the screw shaft 61 mechanically imparts movement to the piston 64 through the washers 70 or 71 and thus to the output gear 66 if no hydraulic fluid is available for the task in the usual manner.

Figure 5:
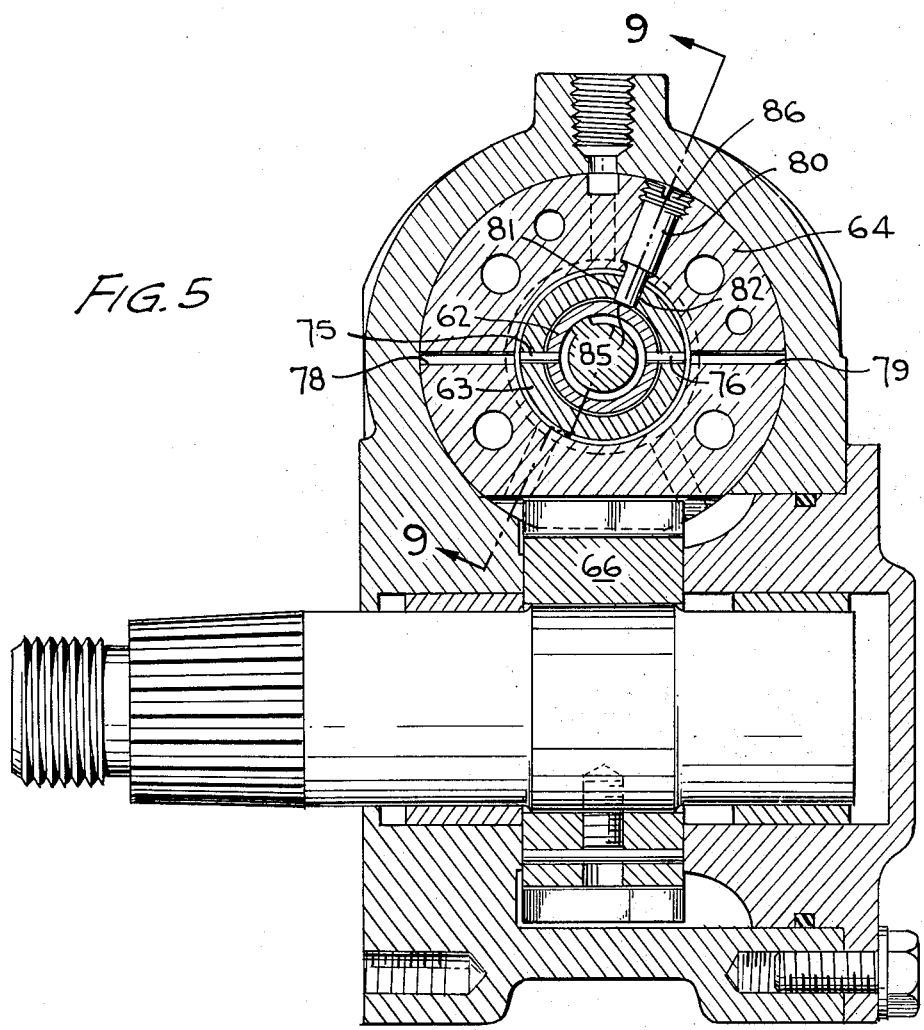
FIG. 5 is a cross-sectional view taken at 90° with respect to the view of FIG. 4 and along line 5—5 of that figure.

In the present invention however, the adjustable rings 72, 73 provide an important feature that leads to the simplified and more accurate assembly of the tandem spool elements 62, 63. First, as can be seen in FIG. 4, only the spool element 63 is provided with a threaded engagement with the screw shaft 61. The spool element 62 is carried in tandem fashion by the element 63 and this is done by employing a pair of radial locking pins 75, 76 on diametrically opposite sides of the tandem spool elements 62, 63, as shown in FIG. 5. To get this pin means accurately placed so that the circular passageways cooperating with the first spool element 62 and the passageways cooperating with the second spool element 63 are exactly coordinated to provide synchronized power through the units $U_3$, $U_4$, is where the use of rings 72, 73 comes into play.

To explain the above, at least one spring 77 is interposed between the adjacent, mating faces of the elements 62, 63 during assembly and prior to positioning of the pins 75, 76. This is accomplished by inserting the elements through the ends of the piston 64 and then drawing up the rings 72, 73 until the corresponding passageways along the spool elements and the piston 64 are brought into exact center position. The spring 77 advantageously serves to resiliently bias the spool elements apart and by carefully drawing the rings 72, 73 inwardly and then testing the outputs from the valves, the exact centered and synchronized position may be easily obtained. After this has been accomplished the holes for the pins 75, 76 are drilled through guide holes 78, 79 (see FIG. 5) in the piston. Since the holes for the pins 75, 76 are not drilled until the final testing of the centering of the valves has been made, the two spool elements 62, 63 are assured of operating in exact synchronization for proper operation of the units $U_3$, $U_4$.

Figure 9:
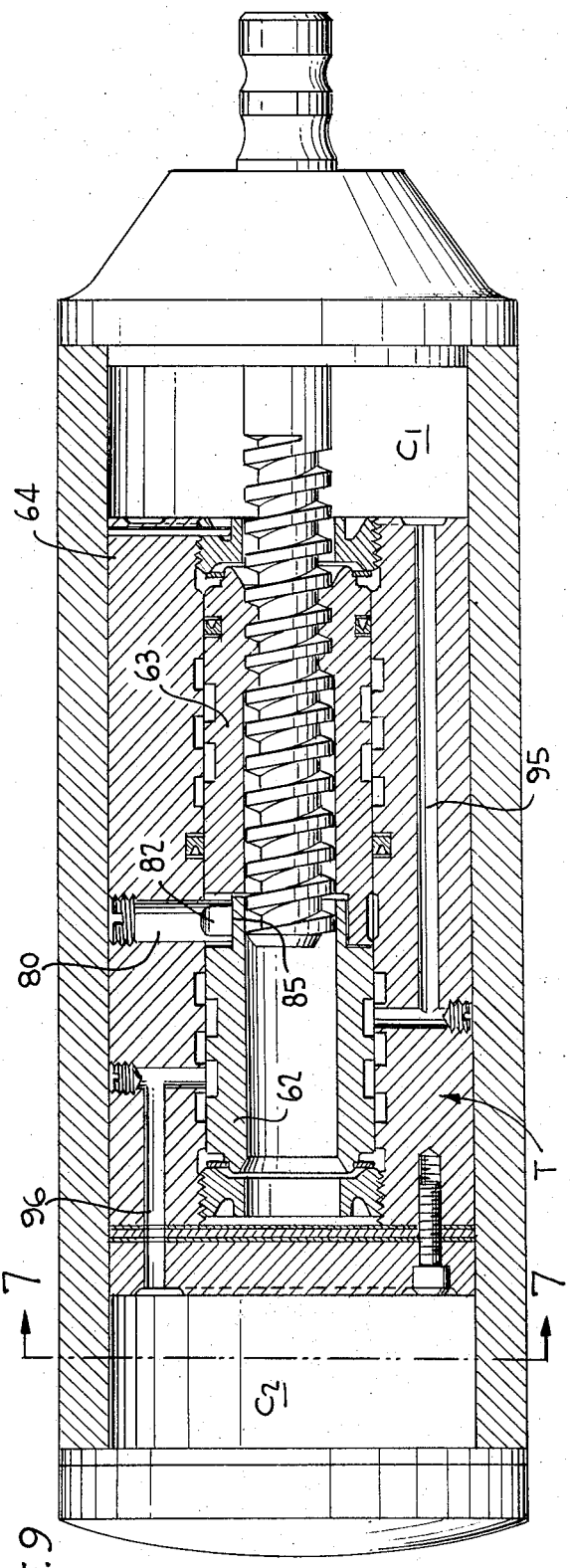
FIG. 9 is still another cross-sectional view taken along line 9—9 of FIG. 5.

The cross sections of FIGS. 5 and 9 show another important feature of the alternative and preferred embodiment of this invention. An alignment pin 80 is inserted into a radial aperture in the piston 64 and serves to guide the tandem spool elements 62, 63 as they are axially shifted along the piston during steering. For this purpose, the terminal end of the pin 80 has parallel, side guide surfaces 81, 82 that fit in a slot formed in the end of the spool element 63, as is shown in FIGS. 5 and 9 of the drawings. The locking pins 75, 76 are noted to be angularly spaced from the pin 80, as shown in FIG. 5. The bottom surface 85 of the pin 80 overlies the reduced portion of the spool element 62 on the tandem valve T. The screw cap 86 of the top of the pin 80 holds the same in position and because of the engagement of the surfaces 81, 82 with the slot backing out during service is impossible.

The combined fluid supply to and from the tandem spool valve T is provided in a novel fashion in the master gear assembly $U_3$. Reference is first made to FIG. 10 wherein the components of the preferred system are designated by like reference numerals as in FIG. 1 but with the addition of the suffix a for further identification.

The master power steering gear assembly $U_3$ is provided with a first power supply input 90 (see FIG. 4) to which is attached the fluid conduit 54a from the pump 53a (see FIG. 10). The fluid passes through a longitudinal slot 91 in the piston 64 and thence through a passageway 92 into communication with the first spool element 62. The exhaust ports 93 operate to exhaust the fluid from the appropriate chamber $C_1$, $C_2$ at the ends of the piston 64 to the exhaust space surrounding the output gear 66 and thence through orifice 94 to the return transfer line 55a (see FIG. 10).

The passageway 95 (see FIG. 9) communicates with the chamber $C_1$ at the right hand end of the housing and the passageway 96 communicates with the left hand chamber $C_2$. Thus, when the spool element 62 is shifted to the right, pressurized fluid would be introduced into chamber $C_2$, moving the piston 64 to the right and thus causing steering in a corresponding direction. The movement to the right causes communication of the passageway 95 with one of the exhaust ports 93 (see FIG. 4) and thus exhausts chamber $C_1$ at the same time. When the spool element 62 is moved in the opposite direction just the opposite action takes place as is well explained in my previous patents.

An important aspect of this invention is that the spool element 62 is operative to perform the functions while riding in tandem with the second spool element 63 that controls another power operating unit, which in this instance is the slave gear assembly $U_4$, which may be constructed as shown and claimed in my copending application entitled, "Power Steering Gear Assembly," filed concurrently herewith, Mar. 7, 1972, Ser. No. 232,420. Reference can be made to this copending application and accordingly a disclosure of this assembly $U_4$ is not deemed to be necessary or desirable in this application.

Figure 8:
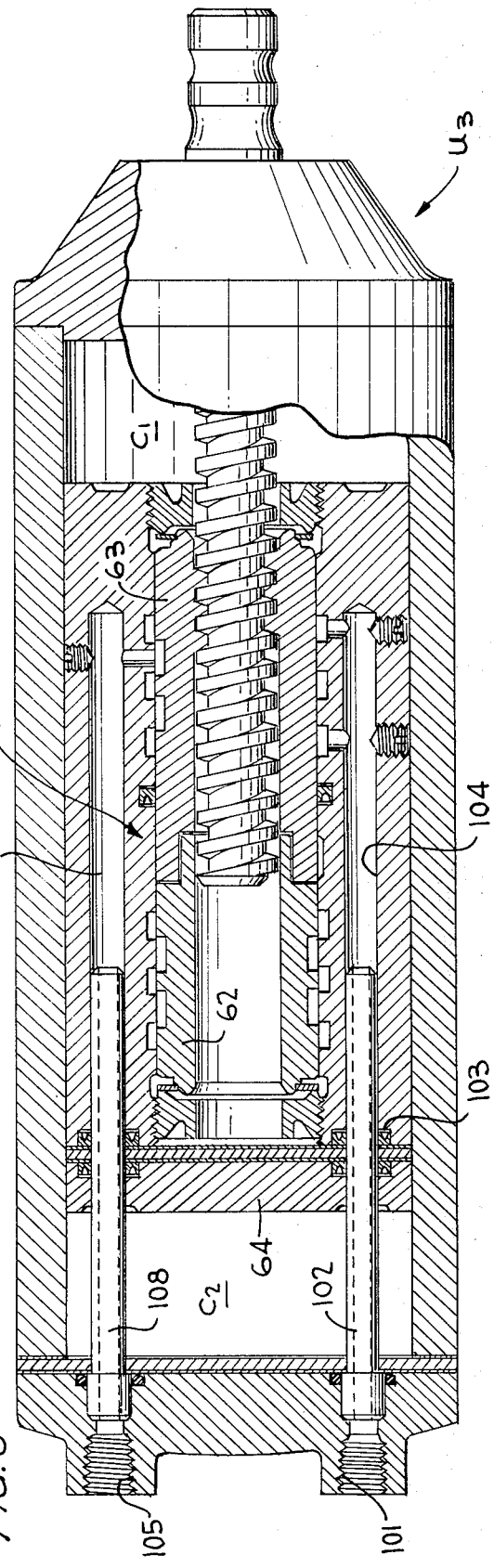
FIG. 8 is another cross-sectional view taken through the master power steering gear assembly, but taken along line 8—8 of FIG. 6.

The pressurized hydraulic fluid is provided for the slave gear assembly $U_4$ through the conduit 51a from the pump 50a to the inlet port 100, shown in FIG. 6 on the end face of the assembly $U_3$. The return from the master steering gear unit $U_3$ is through the conduit 52a from the port or opening 101, shown also in FIG. 6. The transfer of fluid from the spool element 63 to the ports 100, 101 is accomplished through novel telescoping transfer tube arrangements. In FIG. 8, the pump return port 101 is shown with an attached tube 102 which is slidable in elongated passageway 104 with respect to the piston 64 and sealed with respect thereto by the seal combination 103. The elongated passageway 104 terminates at the two circular passageways adjacent the spool element 63 in appropriate manner for return of the fluid from either the right or left chamber of the slave gear assembly $U_4$, as required by the steering operation taking place. The pump supply through port 100 is handled through a similar arrangement (not shown) with a tube working in a passageway in the manner of a trombone slide.

The third and fourth transfer ports in the end of the master steering gear unit $U_3$ are ports or apertures 105 and 106, also shown in FIG. 6. The aperture 105 is attached to a transfer line 107 that transfers the fluid directly to and from one end of the slave power steering gear assembly $U_4$. As shown in FIG. 8, the aperture 105 has a similar trombone tube 108 attached thereto, working in a passageway 109 which is communicating with one of the circular passageways in the spool element 63 to properly transfer the fluid, as explained earlier with respect to FIG. 9. The same trombone slide arrangement is used to feed the fluid to and from the opposite end of the slave gear assembly $U_4$, through a transfer line 110. As mentioned above, the slave gear assembly $U_4$ is or may be the unit shown in my copending application, Ser. No. 232,420, filed Mar. 7, 1972.

From the foregoing, it can be seen that a novel power steering system has been provided that provides a safety factor of two independent combinations of a power operating unit, control means and supply means, each combination handling one-half of the power steering force required. Upon failure of one of the combinations, the other combination is available for power assist so that the vehicle can be properly controlled and brought to a service facility without difficulty. The master power steering gear assembly $U_3$ is an alternative embodiment that is particularly adapted for use in a dual hydraulic power system of the present invention. The tandem valve T with the spool elements 62, 63 controls both the master assembly $U_3$ and the slave power steering assembly $U_4$ to reduce the manufacturing cost and improve the reliability of the overall system. The transfer of fluid from the separate power supply pumps is maintained independent and transferred through separate conduits so that the failure of one combination will not cause failure of the other. The provision of the interposed spring 77 and the locking pins 75, 76 to lock the spool elements 62, 63 together is an important feature that allows still greater manufacturing efficiency and reliability. The alignment pin 80 with the guide surfaces 81, 82 assures that the tandem valve T is always guided in the proper aligned path within the piston 64. The provision of trombone slide transfer arrangements, as shown in FIG. 8, allows the fluid transferred to and from the second spool element 63 to be efficiently handled.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

I claim:

1. A failsafe dual hydraulic power steering system for coordinated wheels of a vehicle ultimately independent of hydraulics comprising first and second power operating units, steering linkage means provided between said wheels and said power operating units to interconnect the same, corresponding first and second power supply means interconnected to the corresponding operating units, synchronized first and second control means connected between the respective operating units and supply means to direct the flow of fluid as required to steer the vehicle, each combination of operating unit, control means and supply means being independent for directly turning separate wheels and each combination providing only approximately 50 percent of the total design force required to allow the operator of the vehicle to comfortably turn said wheels, said first and second control means includes a common steering input shaft for driver operation, at least one of said operating units comprising an integral power steering gear assembly to allow operation upon failure of said supply means including a reciprocating piston, integral valve means and rack, an output gear and crank, and said linkage means includes a drag link connected to said crank to transmit steering motion, interface means between said input shaft and said piston for direct non-hydraulic mechanical connection between said input shaft and said piston for manual steering upon failure of both units, said first and second power operating units and the associated steering linkage means tending to provide differential movement to steering of said wheels and compensating means for accommodating the difference, whereby both of said combinations may normally operate in said system and upon failure of one combination approximately one-half force power steering may still be effective.

2. The system of claim 1 wherein said valve means includes a valve chamber, a first movable spool element in said chamber to regulate the flow to said first power operating means, a second movable spool valve element, guide pin in said piston, an axially extending guide slot in one of said spool elements, locking means to hold said spool elements together, parallel guide surfaces on said pin to fit in said slot to prevent the same from rotating, said guide pin having a radially inward guide surface acting on the outer face of said other spool element and cooperating with said locking means to maintain said spools in perfect alignment.

3. The system of claim 1 wherein said valve means includes a valve chamber, a first movable spool element in said chamber to regulate the flow to said first power operating means, a second movable spool valve element in said chamber, said valve chamber being within said piston, and fluid transfer means spaced from the central axis of said piston for said second operating means including telescoping tubes extending through and forming a seal with a passageway at the end of said piston.

4. The system of claim 1 wherein the total design force of said system allows steering with the application of approximately five foot pounds of input torque to the steering shaft of said vehicle.

5. The system of claim 1 wherein said steering linkage includes a tie rod to connect said wheels to turn together, a steering arm for said each combination, and said compensating means includes resilient means on said tie rod to compensate for said differential movement including that caused by variations in geometry of the steering linkage including said steering arms.

6. The system of claim 5 wherein said resilient means comprises a telescoping connection on said tie rod having inner and outer members, spaced first and second flange means around the periphery of the outer member and pin means through the inner member, slot means for movement of said pin means in said outer member in an axial direction and spring means held between said flanges and said pin means to provide resiliency in both directions.

7. The system of claim 1 wherein said valve means includes a valve chamber, a first movable spool element in said chamber to regulate the flow to said first power operating means, a second movable spool valve element held axially apart from said first element in said chamber by interposed resilient means, adjustable means at the end of said chamber to initially position said elements in synchronization with each other and locking means to fix said elements together in the adjusted position.

8. The system of claim 7 wherein said locking means includes holes drilled during assembly through said elements and radial pin means fixed in said holes.

9. The system of claim 8 wherein said one of said operating units includes in said valve means said spool elements located in the piston and radial access aperture in said piston to position said pin means after assembly of valve means in said piston.

10. The system of claim 8 wherein said pin means includes a pin provided on each of the opposite sides of said spool elements, and guide pin in said piston, an axially extending guide slot in one of said spool elements, locking means to hold said spool elements together, parallel guide surfaces on said pin to fit in said slot to prevent the same from rotating.

11. In a failsafe dual hydraulic power steering system untimately independent of hydraulics having master and slave power steering assemblies for wheels of a vehicle and steering linkage means provided between said wheels and said power steering assemblies to interconnect the same, the improvement of a master power steering gear assembly comprising a housing, a piston slidable in said housing to provide power steering force for said system, and a tandem valve for concurrently operating the master power steering assembly and the slave power steering assembly, said tandem valve including a first spool element for controlling the flow of fluid to said master assembly and a second spool element attached to said first spool element for controlling the fluid to the slave gear assembly, said spool elements being controlled by an input shaft by driver operation, said master steering assembly including interface means between said input shaft and said piston for direct non-hydraulic mechanical connection between said input shaft and said piston for manual steering upon failure of both assemblies, said first and second power steering assemblies and the associated steering linkage means tending to provide differential movement to steering of said wheels and compensating means for accomodating the difference, whereby both of said assemblies may normally operate in said system and only one control assembly is required for said master assembly and said slave assembly.

12. The dual hydraulic power steering system of claim 11 wherein is further provided means for transferring fluid between said second spool element and said slave gear assembly, said transfer means comprising telescoping tubes spaced from the central axis of said piston extending through and forming a seal with corresponding passageways at the end of said piston.

13. The dual hydraulic power steering system of claim 11 wherein said first spool element is attached to said second spool element by means of a radially extending pin means.

14. The dual hydraulic power steering system of claim 13 wherein is further provided an interposed spring between said first spool element and said second spool element to bias said elements apart until locking together the same with said pin means during assembly.

* * * * *